United States Patent Office 3,206,418
Patented Sept. 14, 1965

3,206,418
PROCESS OF POLYMERIZING AND FOAMING A LACTAM CONTAINING A NOVEL COCATALYST
John W. Giberson, Woodstown, N.J., assignor to E. I. du Pont de Nemours and Company, Wilmington, Del., a corporation of Delaware
No Drawing. Filed Mar. 21, 1963, Ser. No. 266,810
11 Claims. (Cl. 260—2.5)

This invention relates to a process, and more particularly to an improved process for the polymerization of lactams to polyamides.

The polymerization of ε-caprolactam to give 6-nylon, a polyamide, has been known for many years. The earliest processes for this polymerization were slow, requiring several hours, and involved the use of water or acidic reagents as polymerization catalysts. Subsequent work showed that anhydrous caprolactam could be polymerized above 200° C. in the presence of strongly basic materials, particularly the alkali and alkaline earth metals, their hydrides, hydroxides, alkoxides, oxides, alkyls or amides. More recently, it has been disclosed that the base-catalyzed polymerization of caprolactam and other lactams can be made especially fast by the addition of certain compounds which function as cocatalysts. Particularly effective cocatalysts which have been disclosed include acylating agents such as acyl halides, anhydrides and the like; isocyanates, and compounds containing tertiary nitrogen having at least two of the three substituents on the nitrogen atom consisting of carbonyl, thiocarbonyl, sulfonyl, phosphenyl, thiophosphenyl and nitroso radicals.

The present invention provides an improved process for rapidly polymerizing lactams. More particularly, the process of this invention is an improvement in the process for polymerizing lactams in the presence of lactam-base salts, which improvement comprises carrying out said polymerization in the presence of a cocatalyst having the formula

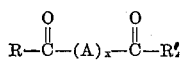

wherein the R and R' which can be the same or different, each comprise a heterocyclic ring having at least one nitrogen in the ring and two conjugated double bonds, $x$ is a cardinal number of up to 1, that is, 0 or 1, and A is selected from the group consisting of acyclic, alicyclic and aromatic biradicals attached through said carbonyl groups to said nitrogen in each of said rings. Where $x$ is 0 the two carbonyl groups are bonded directly together. Particularly preferred as cocatalysts are those where R and R' each have at least two nitrogen atoms in the ring and two conjugated double bonds, $x$ is 0 or 1 and A is a hydrocarbon biradical of up to 18 carbon atoms free of nonbenzenoid unsaturation. Examples of heterocyclic ring systems comprising R and R' in the novel cocatalysts of the present invention are imidazole, pyrazole, indazole, benzimidazole, 1,2,3-benzotriazole, 2,1,3-benzotriazole, indole, carbazole, pyrrole, 1,2,3,6-oxatriazine, 1,2,6-oxadiazine, 1,2,3-triazole and 2,1,3-triazole. Substituted derivatives of the foregoing are also suitable. The substituent can be, for example, alkyl having from 1 to 12 carbon atoms such as methyl, ethyl, propyl, butyl, amyl, 2-ethylhexyl, decyl, dodecyl; 5 to 12 carbon cycloaliphatic such as cyclopentyl, cyclohexyl, cycloheptyl, cyclooctyl, cyclodecyl, cyclododecyl; 6 to 10 carbon aryl, including aralkyl and alkaryl, such as phenyl and naphthyl, phenylethyl, benzyl; p-methylphenyl, m-ethylphenyl and chlorophenyl; halogen such as chlorine and bromine; and amino.

The biradical A can be one derived from acyclic, alicyclic or aromatic hydrocarbons or substituted derivatives thereof with the proviso that the substituent should not react with the alkaline catalyst. A can be, for example, an alkylene biradical such as methylene, ethylene, propylene, butylene, amylene, hexylene; or substituted alkylene biradicals wherein the substituent does not react with the catalyst or caprolactam to prevent polymerization such as methylethylene, methyl propylene, chloroethylene and many others; cycloaliphatic such as cyclopentylidene and cyclohexylidene; and aromatic such as phenylene, tolylene, naphthylene, chlorophenylene and aminophenylene.

Among the compounds of the present invention useful as cocatalysts are 1,1'-sebacoylbis(3-amino-1,2,4-triazole)
1,1'-oxalylbis(pyrazole)
1,1'-succinoylbis(imidazole)
1,1'-adipoylbis(indazole)
1,1'-terephthaloylbis(pyrazole)
1,1'-sebacoylbis(1,2,4-benzotriazole)
1,1'-terephthaloylbis(1,2,3-benzotriazole)
1,1'-adipoylbis(benzimidazole)
1,1'-oxalylbis(indole)
1,1'-malonylbis(imidazole)
1,1'-terephthaloylbis(1,2,4-triazole)
1,1'-isophthaloylbis(imidazole)
1,1'-2,5-dichloroterephthaloylbis(indole)
1,1'-hexahydroterephthaloylbis(imidazole)
1,1'-sebacoylbis(carbazole)
1,1'-2,5-dimethylterephthaloylbis(indole)

These compounds are prepared by methods described in Angew, Chem. 1, 351–367 (1962) International Edition.

The polymerization process of this invention is particularly effective in producing rapidly high molecular weight polyamides from lactams containing from 3 to 12 or more carbon atoms in the lactam ring. Such lactams include pyrrolidone, piperdone, ε- and γ-caprolactam, enantholactam, caprylolactam, and laurolactam. Generally, the anionic polymerization process can be carried out at temperatures above the melting point of the lactam monomer but preferably below the melting point of the resulting polyamide. In general, this temperature range is from about 25° C. to about 200° C., depending on the particular lactam employed. With lactams containing less than 6 carbon atoms in the lactam ring, the preferred temperature of polymerization is below 150° C. ε-Caprolactam is readily polymerized by the process of this invention at temperatures between 100 and 200° C. with 150° C. being a convenient operating temperature.

The lactam-base salts used in the process of this invention are prepared by the reaction of bases with a lactam. Generally, the lactam to be polymerized is used for the preparation of the anionic catalyst; but if desired, the anionic catalyst can be prepared from another lactam.

The base employed to form the anionic catalyst can be an alkali metal, an alkaline earth metal, or a basic derivative of one of these metals such as hydroxide; alkoxide, hydride, alkyl, aryl, amide, or organic acid salt. All of these bases are of the type which are strong enough to convert the lactam to its iminium salt. Thus, sodium hydroxide, potassium hydroxide, lithium hydroxide, magnesium hydroxide, calcium hydroxide, strontium hydroxide, lithium hydride, sodium hydride, sodium methoxide, sodium methyl, sodium ethyl, sodium phenyl, sodium naphthyl, sodamide, and the like are suitable bases for the preparation of the anionic catalyst. This anionic catalyst, that is, lactam-base salt, is prepared by heating the lactam with a base at a temperature between about 25 and 225° C. The base can be added to the total lactam which is to be polymerized or to a portion of the lactam which is to be polymerized and this portion of the resultant lactam containing the anionic catalyst added to more of the lactam later. Little or no polymerization occurs during the preparation of the anionic catalyst carried out between the melting point of the lactam and about 225° C. provided that the catalyst is not held at elevated temperatures for extended periods. If the anionic catalyst is to be stored for appreciable times, then preferably its temperature is held below about 125° C. The time required for this step in the process depends upon the strength of the base employed, the proportion added, and the temperature chosen and can be from a few seconds to several hours. The lactam should be essentially anhydrous as should the added base. The concentration of the base usually is such as to provide a final concentration for the polymerization in the range of between 0.1 and about 10 mole percent based on the total lactam used in preparing the anionic catalyst and the subsequent polymerization. Proportions in the higher end of this range produce lower molecular weight polyamides, so optimum proportions for most purposes are from about 0.2 to 5 mole percent of the strong base. The cocatalyst can be employed in proportions varying from about 0.05 to about 5 mole percent based on the lactam polymerized. The cocatalyst can be added to the lactam containing the anionic catalyst, or equally well the cocatalyst can be dissolved in a separate portion of the molten lactam and the two portions of lactam mixed at the time the polymerization is desired. For optimum operation of the process of this invention an inert gas such as nitrogen is bubbled through the molten lactam during the initial reaction of base with lactam to form the anionic catalyst in order to remove any low molecular weight compound formed such as water and in order to prevent oxidation. Alternatively, the reaction of the lactam with the base can be carried out under reduced pressure in which case the low molecular weight compound is distilled from the lactam.

The process of this invention is useful in rapidly preparing cast articles of any size and shape from lactams. The process can be employed to obtain unusual shapes which would be difficult, if not impossible, to obtain by conventional molding of prepolymerized polycarboxylamides. The process has the advantage when used in this fashion that high temperatures and high pressures normally required in injection molding and similar processes are not necessary. Therefore, simpler lighter weight molds can be employed and faster cycles can often be obtained in the preparation of large shaped articles. The entire process can be carried out in the mold or, if desired, the lactam solution containing the anionic catalyst and a second portion of the lactam solution containing the cocatalyst can be mixed and then immediately cast into the mold by procedures similar to transfer molding to obtain the desired shaped article in any size at a very high rate. Similarly, it is possible to employ the process of this invention in many extrusion-type operations, in which the lactam containing the anionic catalyst and another portion of the lactam containing the cocatalyst are intimately mixed and then extruded under conditions which provide for obtaining an extrudate which is polymerized as it is formed.

The process of this invention is operable in the presence of various fillers and reinforcing agents. Thus, if desired, glass mats or mats of synthetic fibers can be impregnated with the solution and rapidly cured. Similarly, finely divided fillers can be suspended in the polymerizing mixture to obtain filled polycarboxylamides. Antioxidants, blowing agents, plasticizers, other resins (e.g., polystyrene, acrylic, nylon, polyester), colorants, and the like can also be employed in the monomers. The process of this invention contemplates the use of the process under all of the above conditions.

The process of this invention can likewise be used in the presence of a gas-generating material to give foamed plastic articles. The gas-generating material can be a low boiling liquid or an unstable compound which releases gas when heated. The process of this invention likewise can be carried out as a coating process in which the lactam solution containing anionic catalyst and the cocatalyst is applied as a liquid to the surface of a web such as paper or a textile and then permitted to polymerize to the polycarboxylamides and thus form a coating of polycarboxylamide film on a substrate.

The invention is more thoroughly illustrated with the aid of the following examples. Parts and percentages where given are by weight.

*Examples 1 through 14*

In these examples, a mixture of 22.6 parts of ε-caprolactam and base (sodium hydride or sodium methoxide) is placed in a reaction vessel which is immersed in an oil bath at 150° C., nitrogen is bubbled through the molten caprolactam at the rate of 350 cc./minute. After heating for 20 minutes the cocatalyst

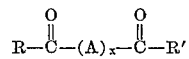

is added to the molten caprolactam at 150° C. The course of the polymerization is observed visually and the time from the addition of the cocatalyst to the time at which no perceptible flow of the melt occurred when the reaction vessel is held at a 40° angle is observed. This is recorded as "no flow time." The total time for the polymerization is manifested by shrinking of the polymer from the walls of the reaction vessel. Solutions of polymers made using the cocatalyst of the present invention in 90% formic acid contained gel particles indicating that cross-linking occurred during the polymerization.

| Example No. | Cocatalyst | Mole Percent | Catalyst | Mole Percent | No Flow Time (min.) |
|---|---|---|---|---|---|
| 1 | 1,1'-terephthaloylbis (indole). | 0.4 | Sodium hydride | 1.5 | 1.2 |
| 2 | 1,1'-terephthaloylbis (carbazole). | 0.4 | ----do---- | 1.5 | 3.0 |
| 3 | 1,1'-terephthaloylbis (benzamidazole). | 0.4 | ----do---- | 1.5 | 6.0 |
| 4 | 1,1'-terephthaloylbis (pyrazole). | 0.4 | ----do---- | 1.5 | 1.3 |
| 5 | 1,1'-terephthaloylbis (1,2,3-benzotriazole). | 0.4 | ----do---- | 1.5 | 3.3 |
| 6 | 1,1'-oxalylbis(pyrazole). | 0.4 | ----do---- | 1.5 | 2.5 |
| 7 | 1,1'-sebacoylbis(pyrazole). | 0.4 | ----do---- | 1.5 | 1.0 |
| 8 | 1,1'-adipoylbis(imidazole). | 0.4 | ----do---- | 1.5 | 17.0 |
| 9 | 1,1'-adipoylbis(1,2,3-benzotriazole). | 0.4 | ----do---- | 1.5 | 12.0 |
| 10 | 1,1'-terephthaloylbis (pyrazole). | 0.2 | Sodium methoxide. | 1.6 | 3.6 |
| 11 | 1,1'-sebacoylbis(pyrazole). | 0.2 | ----do---- | 1.6 | 3.5 |
| 12 | 1,1'-isophthaloylbis(3,5-dimethylpyrazole). | 0.4 | Sodium hydride | 1.5 | 2.0 |
| 13 | 1,1'-sebacoylbis(pyrazole). | 0.4 | ----do---- | 1.5 | 1.0 |
| 14 | 1,1'-azeloylbis(3-amino-1,2,4-triazole). | 0.4 | ----do---- | 1.5 | 16.5 |

*Example 15*

Caprolactam (9072 parts) is sparged by heating to 130° C. and passing nitrogen gas through it for 30 minutes at a rate of 1000 ml. of nitrogen per pound of lactam.

Two percent sodium caprolactam is prepared by cooling the sparged lactam to 100° C., adding 86.54 parts of sodium methoxide, sparging for 45 minutes with nitrogen at a rate of 4000 ml./pound of lactam, and degassing at 100° C. for 20 minutes under a vacuum of 24–25 inches of mercury.

Forty parts of the sparged caprolactam in a 38- x 300-mm. "Pyrex" tube is melted, 2.4 parts of potassium stearate as a mold lubricant added, and 0.86 part of 1,1'-sebacoylbis(pyrazole) is added that the temperature adjusted to 150° C. while bubbling nitrogen through the mixture.

Sodium caprolactam (2%), prepared as described above (40 parts), is melted and the temperature adjusted to 150° C.

n-Nonane (1.39 part) is injected into the sparged caprolactam with a syringe, the 2% sodium caprolactam is added, the mixture blanketed with nitrogen and stirred for 190 seconds with a stirring rod at which time foaming ensued. After a total of 15 minutes the foam is removed from the test tube mold. The foam has medium fine, moderately uniform cell structure and a density of 0.58 gram/ml.

*Example 16*

Caprolactam (9072 parts) is sparged by heating to 130° C. and passing nitrogen gas through it for 30 minutes at a rate of 1000 ml. of nitrogen per pound of lactam.

Three percent sodium caprolactam is prepared by cooling the sparged lactam to 100° C., adding 130 parts of sodium methoxide, sparging for 45 minutes with nitrogen at a rate of 4000 ml./pound of lactam, and degassing at 100° C. for 20 minutes under a vacuum of 24–25 inches of mercury.

Forty parts of the sparged caprolactam in a 38- x 300-mm. "Pyrex" tube is melted, 2.4 parts of potassium stearate as a mold lubricant, and 0.75 part of 1,1'-terephthaloylbis(pyrazole) is added and the temperature adjusted to 150° C. while bubbling nitrogen through the mixture. Sodium caprolactam (3%), prepared as described above (40 parts), is melted and the temperature adjusted to 150° C. This 3% sodium caprolactam is then mixed with the 40 parts of sparged lactam above and sparged for 40 seconds. Dodecenylazide (0.64 part) is injected into the mixture with a syringe, the mixture blanketed with nitrogen and sparged for 57 seconds. After a total of 10 minutes the foam is removed from the test tube mold. The foam has medium fine, moderately uniform cell structure and a density of 0.57 gram/ml. It is quite tough and a ¼-inch disk cut from the foam withstands vigorous blows from a standard carpenter's hammer without damage.

Dodecenylazide, more precisely named 1-azido-5,5,7,7-tetramethyloctene-2, has the structure

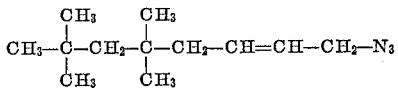

and is prepared by the reaction of the corresponding chloride with a slight excess of sodium azide as described in a copending application Serial No. 171,356, filed February 6, 1962.

*Example 17*

The procedure of Example 16 is repeated with the exception that an equivalent quantity of 1,1'-sebacoylbis(pyrazole) is substituted for the 1,1'-terephthaloylbis(pyrazole). The foamed piece obtained is white. It is exposed outdoors to sunlight for two weeks without discoloration occurring. This example shows the remarkable resistance to discoloration of polycaprolactam made using 1,1'-sebacoylbis(pyrazole) as the cocatalyst.

I claim:

1. In the process the polymerization of lactams to polyamides in the presence of lactam-base salts, the improvement which comprises carrying out said polymerization in the presence of a cocatalyst having the formula

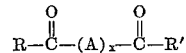

wherein R and R' each comprise a heterocyclic ring having at least one nitrogen in the ring and two conjugated double bonds, $x$ is a cardinal number of up to 1 and A is selected from the group consisting of acyclic, alicyclic and aromatic biradicals bonded through said carbonyl groups to said nitrogen in each of said rings.

2. A process for the polymerization of a lactam to a polyamide which comprises heating said lactam at a temperature between the melting point of said lactam and the melting point of said polyamide in the presence of a base and a cocatalyst having the formula

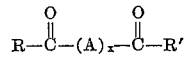

wherein the R and R' each comprise a heterocyclic ring having at least two nitrogen atoms in the ring and two conjugated double bonds, $x$ is a cardinal number of up to 1 and A is selected from the group consisting of acyclic, alicyclic and aromatic hydrocarbon biradicals of up to 18 carbon atoms bonded through said carbonyl groups to one of said nitrogen atoms in each of said rings.

3. A process of claim 2 wherein said lactam is ε-caprolactam.

4. A process of claim 3 wherein said base is a sodium hydride-lactam salt.

5. A process of claim 3 wherein said base is a sodium methoxide-lactam salt.

6. A process of claim 3 wherein in said cocatalyst A is p-phenylene.

7. A process of claim 6 wherein in said cocatalyst the R and R' are pyrazole.

8. A process of claim 6 wherein in said cocatalyst the R and R' are indole.

9. A process of claim 3 wherein in said cocatalyst the R and R' are pyrazole, $x$ is 1 and A is alkylene.

10. A process of claim 9 wherein said cocatalyst is 1,1'-sebacoylbis(pyrazole).

11. The process of claim 1 wherein said reaction is carried out in the presence of a gas-evolving compound to yield a foamed plastic.

No references cited.

MURRAY TILLMAN, *Primary Examiner.*